J. FRYKBERG.
THEFT PREVENTING MECHANISM FOR AUTOMOBILES.
APPLICATION FILED JULY 24, 1916.
1,221,435.
Patented Apr. 3, 1917.
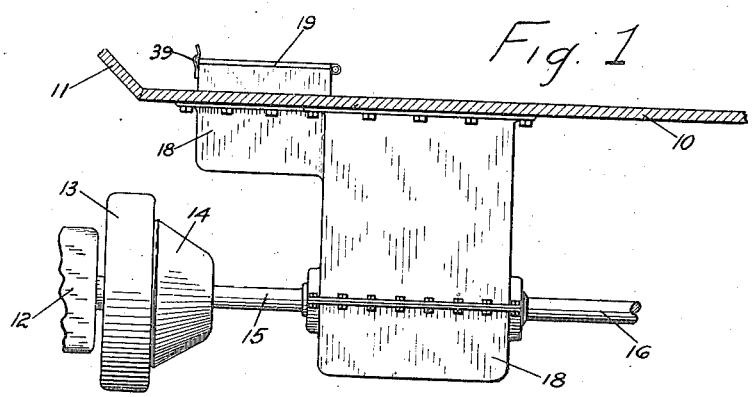
Fig. 1
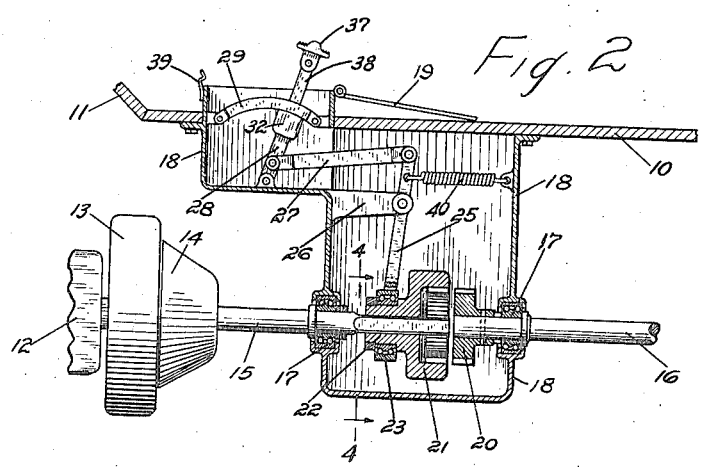
Fig. 2
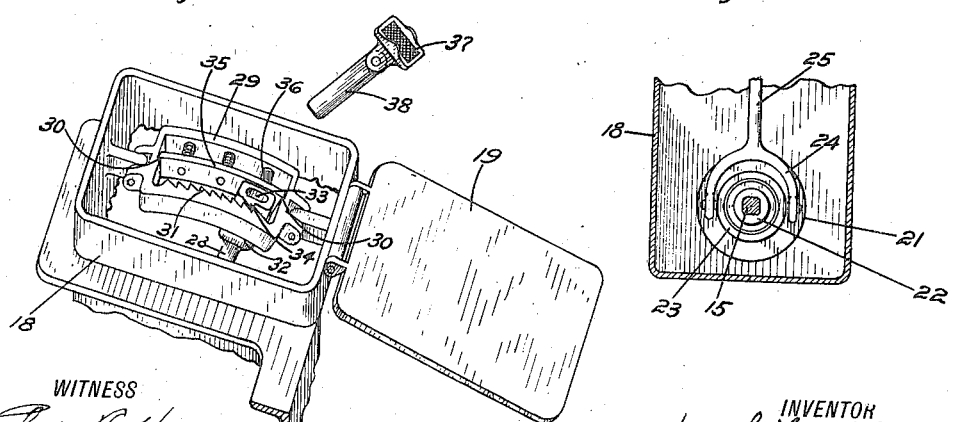
Fig. 3
Fig. 4
WITNESS
Chester F. Hayden.
INVENTOR
Jacob Frykberg
BY
A. M. Wooster
ATTORNEY

UNITED STATES PATENT OFFICE.

JACOB FRYKBERG, OF BRIDGEPORT, CONNECTICUT.

THEFT-PREVENTING MECHANISM FOR AUTOMOBILES.

1,221,435.   Specification of Letters Patent.   Patented Apr. 3, 1917.

Application filed July 24, 1916. Serial No. 110,904.

*To all whom it may concern:*

Be it known that I, JACOB FRYKBERG, a citizen of the United States, residing at Bridgeport, county of Fairfield, State of Connecticut, have invented an Improvement in Theft-Preventing Mechanism for Automobiles, of which the following is a specification.

This invention has for its object to provide theft-preventing mechanism adapted for use on all classes of motor cars, and especially adapted for use upon medium and low priced cars.

With this end in view I have devised the novel mechanism which I will now describe, referring to the accompanying drawing forming a part of this specification and using reference characters to indicate the several parts:

Figure 1 is a fragmentary longitudinal section of the floor of a car, showing the propeller shaft, clutch, fly wheel, and a casing in which my novel invention is inclosed, in elevation;

Fig. 2 a similar view, the casing being in section on the line of the propeller shaft and my novel mechanism being shown partly in elevation and partly in section;

Fig. 3 a detail perspective view on an enlarged scale showing the quadrant and operating lever, and the removable pedal, and Fig. 4 is a section on the line 4—4 in Fig. 2, looking in the direction of the arrows.

10 denotes the floor of a car, 11 the toe board, 12 the motor, 13 the fly wheel, and 14 the clutch, all of which parts may be of any ordinary or preferred construction.

The novelty of the invention consists in the use of a two-part propeller shaft, a safety clutch for connecting and disconnecting the parts of the shaft, and clutch-operating connections controlled by a removable pedal. 15 and 16 denote the parts of the propeller shaft, which are journaled in ball bearings 17 in the walls of a casing 18, the ends of the parts of the shaft extending into the casing and lying contiguous to each other. The casing is secured to the under side of the floor and a portion of the casing extends upward through the floor and is provided with a cover 19. The safety clutch comprises a fixed and a movable gear wheel within the casing. In the present instance part 16 of the propeller shaft is shown as carrying a spur gear wheel 20. The inner end of part 15 is made angular and carries a sliding internal gear wheel 21 which is adapted to engage gear wheel 20. The internal gear wheel is provided with a hub 22, itself carrying a ball bearing 23. A yoke 24 on a lever 25 is pivoted to the outer race of the ball bearing. The lever has its fulcrum on a bracket 26 in the casing and the other arm of the lever is connected by means of a link 27 with an operating lever 28 pivoted in the portion of the casing which extends through the floor of the car. Within this portion of the casing and rigidly secured in place is a quadrant 29 having an opening with shoulders 30 at its ends near the mid-width and upon one side a rack 31. At the upper end of the operating lever is a head 32 having a socket 33 and upon one side a lug 34 which is adapted to engage the teeth of the rack. The head is retained with the lug in engagement with the rack by means of a plate 35 which is held against the head by springs 36, the shoulders in the opening serving as stops to limit the movement of the plate. The head of the operating lever lies flush or approximately flush with the top of the quadrant and the plate, so as to make it impossible to manipulate the operating lever by hand. 37 denotes a pedal pivoted to a shank 38 which is adapted to engage the socket in the head of the operating lever.

Figs. 2 and 3 show the parts in the safety or theft preventing position. When it is desired to use the car, the operator places the shank of the pedal in the socket in the head, moves the pedal toward the right against the power of springs 36 to disengage the lug from the rack and then pushes the pedal and with it the operating lever forward to place the members of the safety clutch in engagement (this position of the parts not being shown), the plate and springs acting upon the head to retain the lug in engagement with the rack, with the members of the safety clutch in the operative position. The pedal is then removed and the cover shut down to cover the casing, a suitable catch 39 being provided to retain the cover closed. When it is required to leave the car, the operator places the shank of the pedal in the socket in the head again and moves the head backward to the position shown in Figs. 2 and 3, (the lug sliding over the rack teeth), which disengages the members of the safety clutch. The operator then removes the pedal and takes it away with him. In this position of the parts, theft of the car is practically impossible for the reason that if the motor is started, part 15 only of the propeller shaft will be driven, as part 16 of the propeller shaft is disconnected therefrom and it is thus rendered impossible to transmit driving power to the rear axle, not shown, as specifically it forms no portion of the present invention. A spring 40, connected to lever 25 and to the casing, may or may not be used to assist the operator in shifting the movable safety clutch member to the safety position.

Having thus described my invention, I claim:—

1. In a motor vehicle, the combination, with the power-plant of the vehicle and the clutch for connecting and disconnecting said power-plant and the wheel-driving mechanism, of a two-part propeller shaft, a clutch for connecting and disconnecting the parts of said shaft, and a lever for operating the movable member of said last-mentioned clutch, said lever comprising an incased and ordinarily inaccessible portion and a removable extension thereof projecting to accessible position, substantially as and for the purpose set forth.

2. In a motor vehicle, the combination, with the power-plant of the vehicle and the clutch for connecting and disconnecting said power-plant and the wheel-driving mechanism, of a two-part propeller shaft, a clutch for connecting and disconnecting the parts of said shaft, and a lever for operating the movable member of said last-mentioned clutch, said lever comprising an incased and ordinarily inaccessible portion and a removable extension thereof projecting to accessible position, the incased portion of said lever being provided with a head having a socket therein and one end of said extension being adapted to fit within said socket.

3. In a motor vehicle, the combination, with the power-plant of the vehicle and the clutch for connecting and disconnecting said power-plant and the wheel-driving mechanism, of a two-part propeller shaft, a clutch for connecting and disconnecting the parts of said shaft, a lever for operating the movable member of said last-mentioned clutch, said lever comprising an incased and ordinarily inaccessible portion and a removable extension thereof projecting to accessible position, a spring for yieldingly retaining said clutch members in disconnected condition, and means for checking said members in connected condition against the action of said spring.

4. In a motor vehicle, the combination, with the power-plant of the vehicle and the clutch for connecting and disconnecting said power-plant and the wheel-driving mechanism, of a two-part propeller shaft, a clutch for connecting and disconnecting the parts of said shaft, a lever for operating the movable member of said last-mentioned clutch, said lever comprising an incased and ordinarily inaccessible portion and a removable extension thereof projecting to accessible position, the incased portion of said lever being provided with a head having a socket therein and one end of said extension being adapted to fit within said socket, a spring for yieldingly retaining said clutch members in disconnected condition, and means for checking said members in connected condition against the action of said spring.

In testimony whereof I affix my signature.

JACOB FRYKBERG.